United States Patent
Seymour et al.

(10) Patent No.: US 6,871,190 B1
(45) Date of Patent: Mar. 22, 2005

(54) SYSTEM AND METHOD FOR CONDUCTING AN ELECTRONIC AUCTION OVER AN OPEN COMMUNICATIONS NETWORK

(75) Inventors: Mark Seymour, Welwyn Garden (GB); Stephen J. Emmott, London (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/395,847

(22) Filed: Sep. 14, 1999

(Under 37 CFR 1.47)

(30) Foreign Application Priority Data

Sep. 14, 1998 (GB) ............................................. 9819933

(51) Int. Cl.⁷ ............................................... G06F 17/60
(52) U.S. Cl. .......................................... 705/37; 705/26
(58) Field of Search ............................... 705/37, 5, 26, 705/35; 235/381

(56) References Cited

FOREIGN PATENT DOCUMENTS

GB          2319862         6/1998

*Primary Examiner*—Vincent Millin
*Assistant Examiner*—Sandra Snapp
(74) *Attorney, Agent, or Firm*—Gates & Cooper LLP

(57) ABSTRACT

An interactive system conducts auctions over an open communications network. Remote bidder site(s) are interconnected with remote scum site(s). Data for desired merchandise to be acquired at an auction is entered and a bidding strategy is automatically generated at a remote bidder site. The generated bidding strategy is dien implemented at a remote seller site. Auction data relating to merchandise to be auctioned is entered and a selling strategy is generated on the basis of the auction data at the seller site. Thereafter, the generated selling strategy is implemented by interaction with bidding agent(s) at the seller site. During an auction at a seller site, the bidder and seller actions are controlled and synchronized.

27 Claims, 8 Drawing Sheets

SYSTEM AND METHOD FOR CONDUCTING AN ELECTRONIC AUCTION OVER AN OPEN COMMUNICATIONS NETWORK

BACKGROUND OF THE INVENTION

The present invention relates to electronic commerce and in particular to an interactive computer system and method for conducting auctions over the Internet.

Buying and selling over the Internet is predicted to account for a significant percentage of commercial transactions for goods and services over the next decade. An important growth area in the field of electronic commerce are on-line auctions and there are currently numerous such facilities available on the Internet. Dedicated auction house Web pages advertise the merchandise to be auctioned and give details of the time period bids will be accepted and the current high bids. On accessing such a Web site, an interested party must first register at the site giving personal details such as name, address etc. and payment instructions such as credit card details for account settlement in the event of a successful bid. If the party wishes to bid for a particular merchandise lot for auction at that site, he must complete an on-line bid form which is then submitted by electronic mail to the auction house server where it is processed. The current bid price displayed on the Web page for the merchandise in question is updated in accordance with new bids received. On close of the auction, successful bidders are notified by electronic mail, payment is effected and the purchased merchandise is delivered in accordance with the payment and delivery instructions submitted on registration by the successful bidding party.

Although on-line auctions available over the Internet present considerable advantages over traditional auctions, in that they are accessible to a wider audience and do not necessitate physical presence at a particular location at a particular time, there are several difficulties and shortcomings associated with these facilities. Firstly, for a consumer interested in purchasing a particular item of merchandise at an auction, it is necessary to find on-line auction sites having such merchandise for auction. Since the majority of search engines currently available on the Web are general in scope, the average keyword search for "auction" and the "desired merchandise item" will produce thousands of "hits", most of which have nothing to do with either auctions or the merchandise item in question but just happen to have those words buried somewhere in the web site text. Hence, a consumer may experience considerable difficulties in even finding a suitable on-line auction.

Secondly, on submitting a bid to the auction server, the bidder must regularly monitor the current high bid price on the auction house Web page in order to keep informed as to the progress of the auction. Since bids ate sometimes accepted over a time period of several hours, days or even weeks, a bidder may have to access the Web pages on several occasions in order to determine whether it is necessary to submit a higher bid. Even if an interested bidder waits until close to the deadline for accepting bids before submitting a bid higher than the current high bid price at that time, it can take considerable time for the bid to be delivered by electronic mail and there is a risk that the bid will not be processed in time or that a higher bid will be received and accepted before the deadline. Hence, unlike in a traditional auction where the physical presence of a bidder at the auction means that they can react immediately on a real-time basis, the ability of bidders to react as the auction progresses is severely restricted by network limitations.

For sellers too, current on-line auction facilities present considerable difficulties. Sellers must also search the Web for a suitable auction site at which to offer their merchandise for auction and again like bidders are unable to react as the auction progresses on a real-time basis. For example, if a seller decides close to the deadline for accepting bids to withdraw his merchandise from the auction or to change the minimum bid price that will be acceptable, the situation may well be out of his control in that there is no guarantee that the notice of withdrawal submitted by electronic mail will be reach the auction server and be processed in time.

Hence, there currently does not exist any easy method for enabling this important sector of electronic commerce to be performed by either consumers or providers. None of the facilities currently available are automated nor do they offer intelligent support to the user. Moreover, finding appropriate Internet auctions can be extremely difficult at present.

SUMMARY OF THE INVENTION

It is an object of the present invention to provide an improved system and method for conducting electronic auctions over an open communications network.

According to a first aspect of the present invention, there is provided an interactive computer system for conducting auctions over an open communications network comprising one or more remote bidder sites interconnected with one or more remote seller sites, characterized in that a bidder site comprises:

data input means for entering data relating to desired merchandise to be acquired at an auction;

bidding strategy generation means for automatically generating a bidding strategy on the basis on the input data relating to the desired merchandise; and mobile bidding agent means adapted to implement the generated bidding strategy at a remote seller site; and in that a seller site comprises:

data input means for entering data relating to merchandise to be auctioned;

selling strategy generation for generating a selling strategy on the basis on the input data relating to the merchandise to be auctioned;

selling agent means adapted to implement the generated selling strategy by interaction with one or more bidding agents at that seller site; and auction management means for controlling and synchronizing the bidder and seller agent means during an auction at that seller site.

According to a second aspect of the present invention, there is provided a method for conducting an auction over an open communications means comprising a plurality of remote interconnected sites characterized by the steps of:

creating at a remote seller site, seller agent means arranged to implement a predetermined selling strategy in relation to merchandise to be auctioned at that seller site;

creating at one or more bidder sites, bidder agent means arranged to implement a predetermined bidding strategy at a remote seller site;

transmitting the bidder agent means over the network to a remote seller site; and conducting an auction at the remote seller site by implementing the selling strategy of the seller agent means and the bidding strategies of the one or more bidder agent means.

The present invention automates the auction process (i.e., bidding, buying and selling) by enabling buyers and sellers to create "agents" which act on their behalf in the Internet auction. The agents are capable of communicating with each other in order to conduct the auction process and to execute a transaction between one or more successful bidders and the seller.

BRIEF DESCRIPTION OF THE DRAWINGS

Embodiments of the present invention will now be described by way of example, with reference to the accompanying drawings in which.

DETAILED DESCRIPTION

For ease understanding, the four major types of auction which may be conducted with the system of the present invention will be described briefly. In a sealed bid auction, each bidder submits a bid without any knowledge of the bid price of other bidders. The merchandise is sold to the highest bidder for the highest bid price, provided that this price equals or exceeds a predetermined reserve bid price. A Vickrey auction is similar to a sealed bid auction but the merchandise is sold to the highest bidder at the second highest bid price submitted by a bidder, provided that this price equals or exceeds the predetermined reserve bid price. In an English auction, bidding is opened at a predetermined starting price and only bids higher than that price will be accepted. The merchandise is sold to the highest bidder for the highest bid price, provided that this price equals or exceeds a predetermined reserve bid price. A Dutch auction is opposite to an English auction in that bidding is opening at a high bid price and is lowered until a bidder agrees to pay the current bid price, provided that this price equals or exceeds a predetermined reserve bid price.

Figure 1:
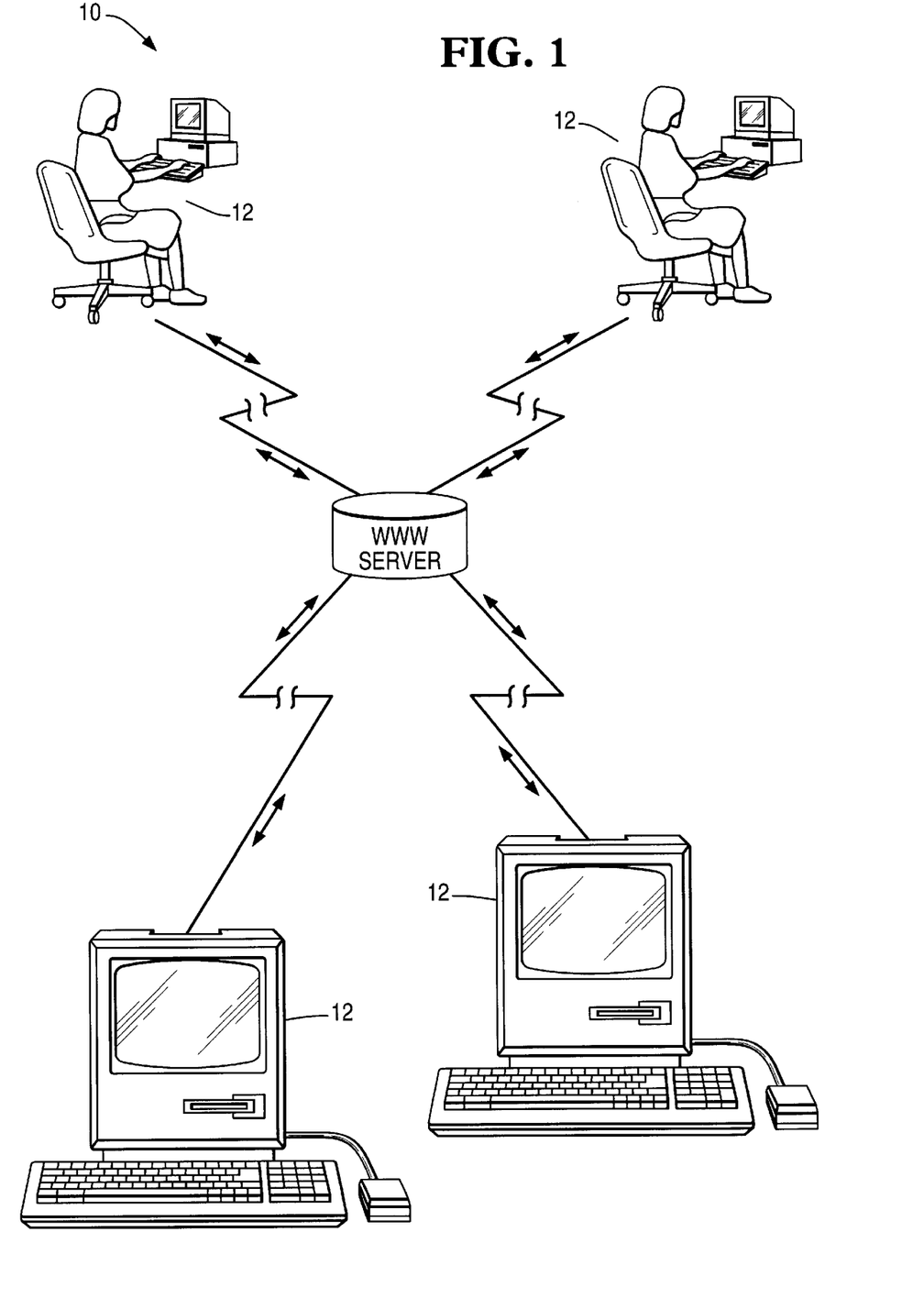
FIG. 1 is a schematic diagram representing an open communications network according to the present invention.

Referring to FIG. 1, the communications network 10 comprises a plurality of remote computer sites 12 interconnected by the Internet. The plurality of remote computer terminals 12 includes one or more of bidder sites 20 representing one or more parties who wish to participate in an auction so as to purchase particular merchandise and one or more seller sites 40 representing one or more parties offering particular merchandise for sale by auction.

Figure 2:
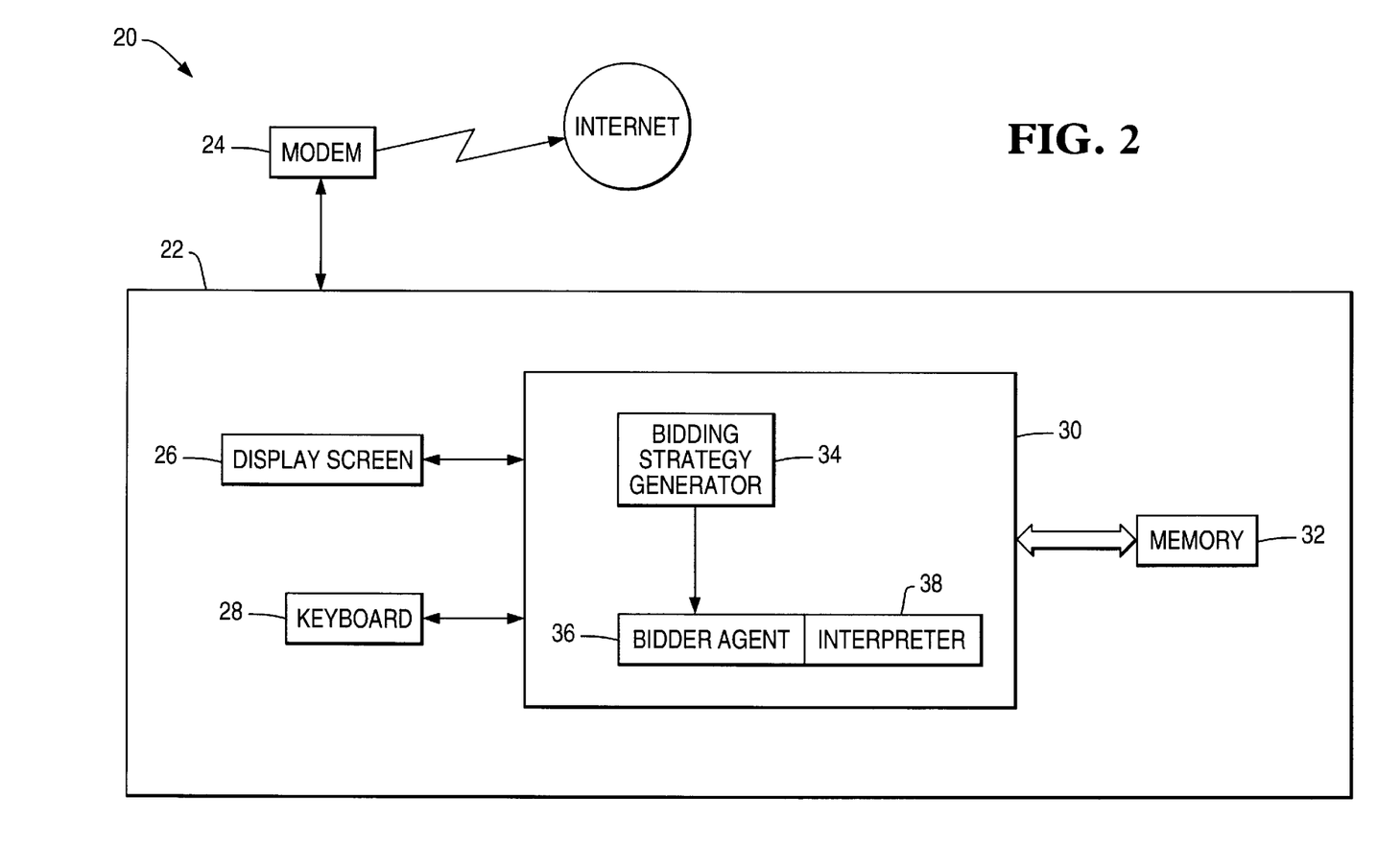
FIG. 2 is a block diagram representing the main components of a bidder site of the open communications network of FIG. 1.

FIG. 2 illustrates the components of a bidder site 20. The bidder site 20 includes a computer terminal 22 connected to the Internet by means of a modem 24. The computer terminal 22 includes a user interface means in the form of a display screen 26 and a keyboard 28 to allow a user to interact with the terminal at the bidder site 20, a central processing unit 30 for processing data and for controlling the operation of the bidder site 20 and a memory unit 32 coupled to the central processing unit 30 for storing data. The central processing unit 30 includes a bidding strategy generator 34 for generating a specific bidding strategy for an auction on the basis of appropriate data input by a user at the bidder site 20, a mobile bidding agent 36 for implementing the specific bidding strategy at a remote seller site 40 and a bidding agent interpreter 38 for interpreting the information contained within the bidding agent 36 and running the bidding agent 36 as an automaton.

Figure 3:
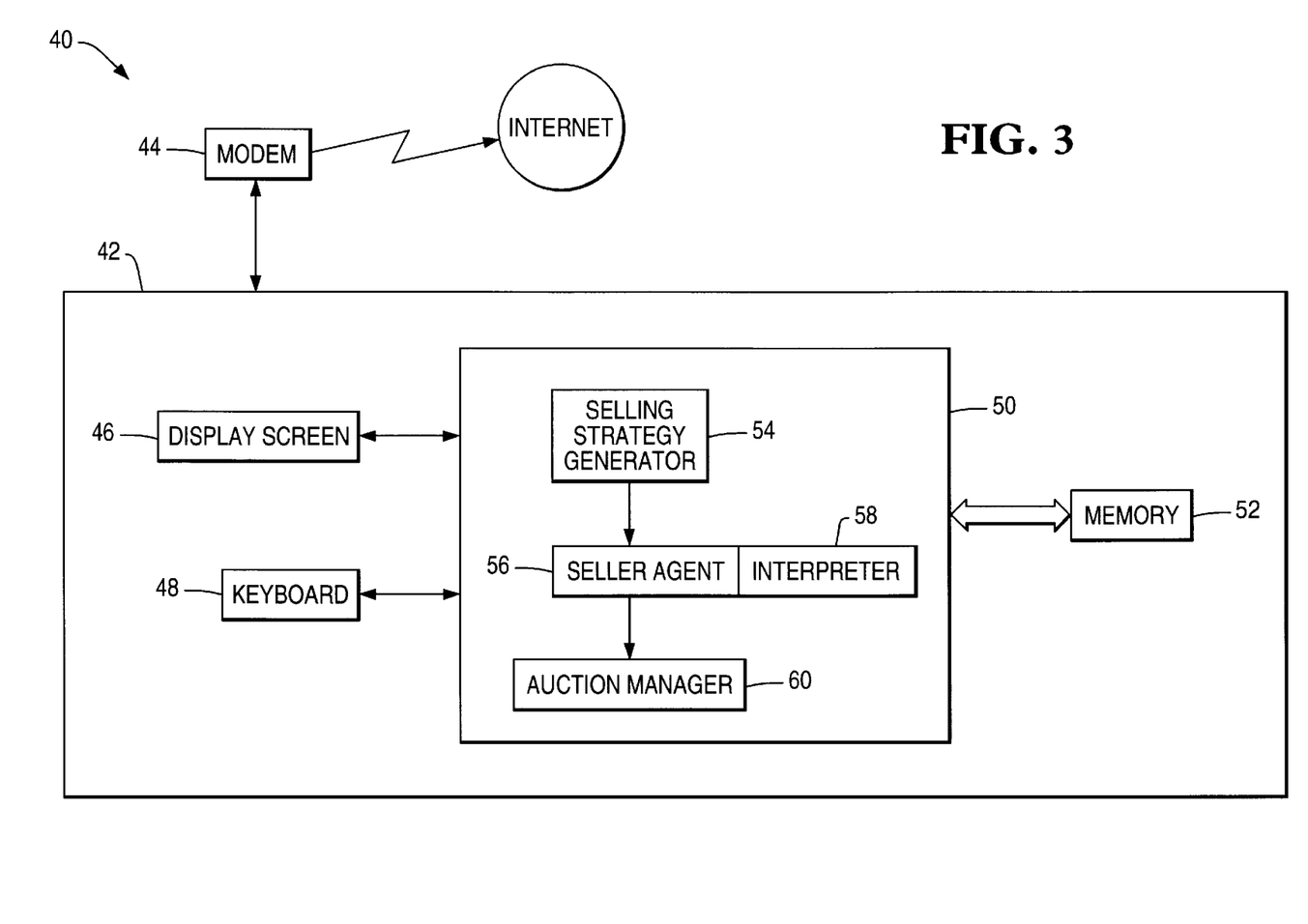
FIG. 3 is a block diagram representing the main components of a seller site of the open communications network of FIG. 1.

FIG. 3 illustrates the components of a seller site 40. The seller site 40 includes a computer terminal 42 connected to the Internet by means of a modem 44. The computer terminal 42 includes a user interface means in the form of a display screen 46 and a keyboard 48 to allow a user to interact with the terminal at the seller site 40, a central processing unit 50 for processing data and for controlling the operation of the seller site 40 and a memory unit 52 coupled to the central processing unit 50 for storing data. The central processing unit 50 includes a selling strategy generator 54 for generating a specific selling strategy for an auction on the basis of appropriate data input by a user at the seller site 40, a selling agent 56 for implementing the specific selling strategy at that seller site 40 by interaction with one or more bidder agents 36, a selling agent interpreter 58 for interpreting the information contained within the selling agent 56 and running the selling agent 56 as an automaton and an auction manager 60 for controlling and synchronizing bidder and seller agents 36 and 56 during an auction at that seller site 40.

The bidding and selection strategy generators 34 and 54 comprise evolved bidding and selling strategies respectively which have been created on the basis of certain assumptions. In the preferred embodiment of the present invention, the evolved strategies are generated by estimating for the following parameters:

(i) the approximate minimum value that could be expected to be received for the merchandise to be auctioned;

(ii) the approximate maximum value that could be expected to be received for the merchandise to be auctioned;

(iii) the maximum valuation range for the merchandise to be auctioned; and (iv) the minimum valuation range for the merchandise to be auctioned.

These estimates are intended to cover all possible price scenarios which could be achieved for the merchandise at an auction. A series of basic bidding and selling strategies are then generated for each type of auction type (i.e. Sealed bid, Vickrey, English or Dutch) on the basis of these values and are encoded using a set of fuzzy logic rules and genetic algorithm structures. Genetic algorithms are parallel algorithms that transform populations of individual objects (genomes encoded solutions to problems) into new populations. The operations that are used to effect the transformation are analogous to those found in natural genetic operations such as sexual recombination or crossover. The individuals in the population are encoded as sequences of numbers which typically consist of a fixed or variable length binary character string. An initial population of genomes is evaluated to test for fitness with respect to a particular purpose and genetic operations on selected individuals result in the generation of a new population of individuals.

Hence, the series of basic generated selling and/or bidding strategies are tested in a simulated auction environment simulator and the fittest basic strategies are selected on the basis of the profit generated or loss incurred at the simulated auction. The fittest strategies are combined together to form a new population of strategies using crossover and mutation operations. This procedure is repeated for a predetermined number of strategy generations until an acceptable bidding and/or selling strategy is generated.

It should be understood that one or more acceptable bidding and/or selling strategies generated in this way are implemented in software and are downloaded on the processing unit of the terminals at the remote sites of the system of the present invention. These bidding and/or selling strategies will be subsequently used to generate further specific bidding and/or selling strategies based on specific data input by a bidder or seller at a remote terminal as will be described below.

Bidder 36 and seller 56 agents are then created to implement the specific bidding or selling strategy generated at the bidder 20 or seller 40 sites. The present invention uses intelligent agent techniques, including mobile agent techniques to automate the auction process (bidding, buying and selling) for auctions conducted over the Internet. Intelligent mobile agent techniques allow software objects (Agents) to be transmitted between different computing elements on the network, allowing new code to enter an existing element, run in order to perform some data gathering exercise and then as appropriate move on to another element.

The bidder 36 and seller 56 agents are intelligent agents and comprise scripts written in an SGML-based language. The scripts define all the properties that a bidder or seller may wish the agent to possess in order to act on their behalf at an auction. For example, the seller agent script may comprise information regarding the merchandise to be auctioned, the type of auction to be conducted (e.g. Sealed bid, Vickrey, English or Dutch), and the date and time that the auction is scheduled to take place. The seller agent script will also comprise the specific selling strategy generated at the seller site 40. For obvious security reasons, the specific selling strategy will be encoded and embedded within the seller agent script. The seller agent 46 has an associated interpreter 58 which serves to interpret the information contained in the script and to run the seller agent 56 as an automaton, i.e. the agent has various states and transitions.

The bidder agent script may comprise information regarding the location of specific seller sites 20 or geographical network limits and/or time limitations within which to search for seller sites 20 and information regarding the desired merchandise to be purchased at the auction. The bidder agent script will also comprise the specific bidding strategy generated at the bidder site 20 which again for security reasons will be encoded and embedded within the seller agent script. The bidder agent 36 has an associated interpreter 38 which to interpret the information contained in the script and to run the bidder agent 36 as an automaton, i.e. the agent has various states and transitions. However, in contrast to the seller agent 56, the bidder agent 36 is implemented in mobile agent technology so that the bidder agent 36 can move away from the bidder site 20 and run at remote seller sites 40.

Figure 4:
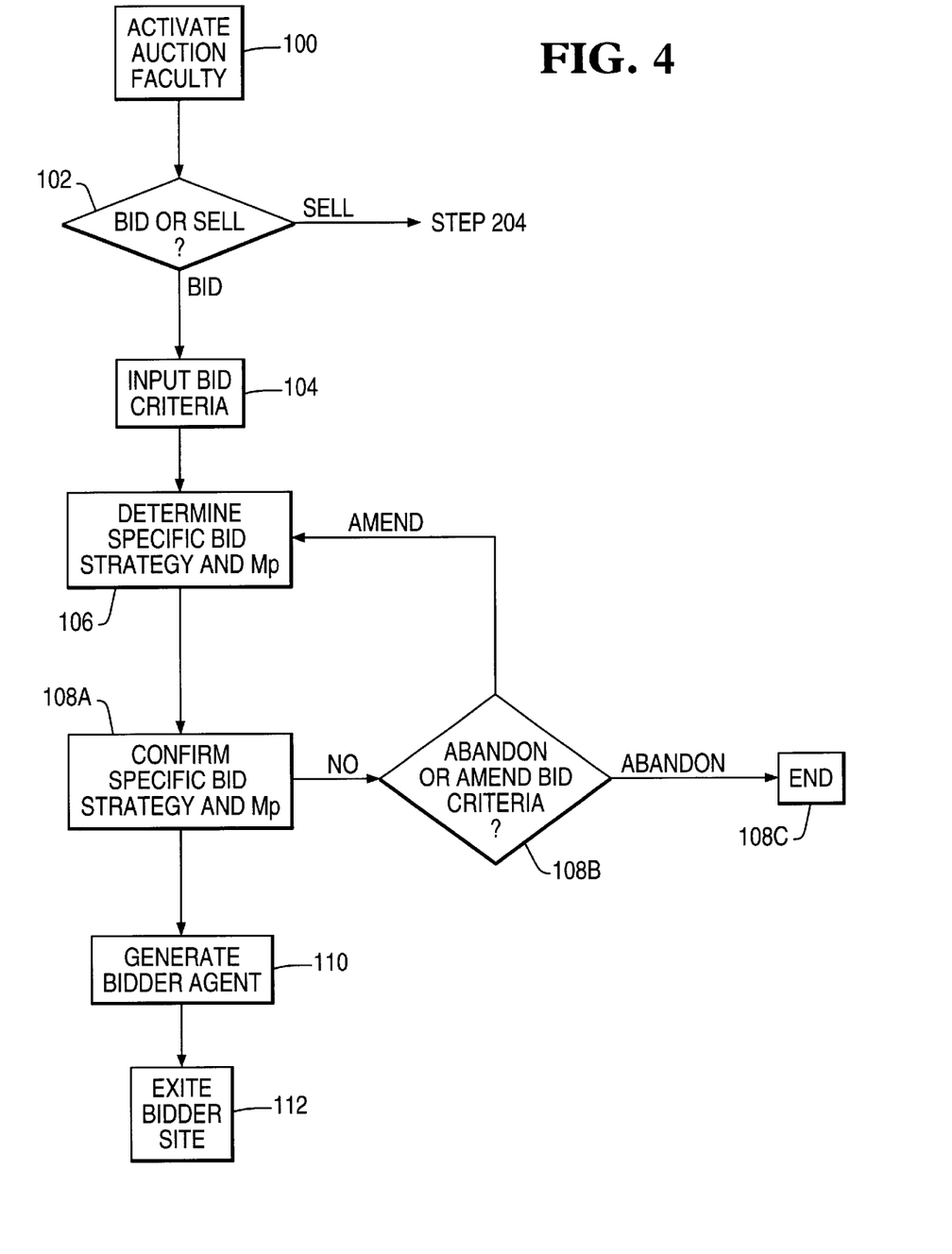
FIG. 4 is a flow diagram representing the creation of a bidder site.
Figure 5:
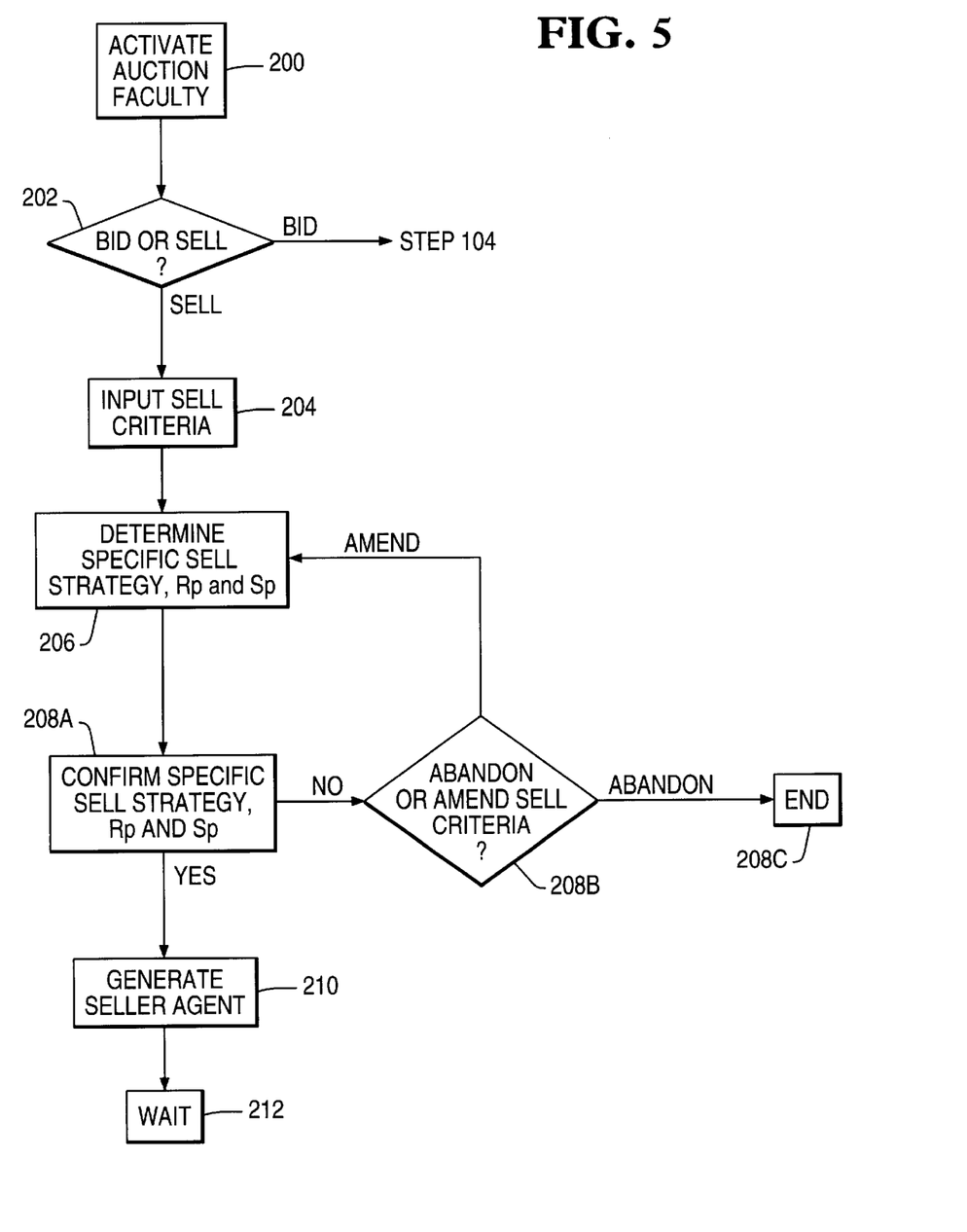
FIG. 5 is a flow diagram representing the creation of a seller site.

The creation of bidder and seller sites 20 and 40 and a typical on-line auction carried out in accordance with the present invention will now be described with continuing reference to FIGS. 1 to 3 and with reference to the flow diagrams shown in FIGS. 4 to 6. Referring first to FIG. 4, a person ("bidder") at a remote site 20 wishes to buy a particular type of car at an auction. The bidder activates the on-line auction facility on his computer terminal 22 by clicking on the appropriate icon on his screen 24 (Step 100).

The bidder is first requested to input whether he wishes to bid or to sell and selects the bid icon displayed on the screen 24 (Step 102). A bid template appears on the screen 24 into which the bidder enters via the keyboard 26 criteria concerning the car he wishes to buy, such as the manufacturer, the model type, the year or years of manufacture, the maximum and minimum price that he is prepared to pay for the car and geographical area limitations for possible auctions at which he is prepared to bid (Step 104). It should be understood that other criteria such as the color of the car, the maximum number of owners etc., may also be stipulated by the bidder as desired.

It should also be appreciated that the criteria to be entered by a bidder in the bid template will vary according to the desired merchandise. For example, if the bidder wishes to purchase a holiday by auction, the criteria may include one or more destinations, the type of accommodation required, the duration of the holiday, etc.

The input data is transmitted to the central processing unit 30 of the terminal 22 and an optimum value for the maximum bid price is generated by the bidding strategy generator 34 (Step 106). The optimum maximum bid price generated is displayed on the screen 24 and the bidder is requested to confirm agreement with this value and that the specific bid strategy generated should be implemented (Step 108A). On confirmation of agreement with the maximum bid price and to implementation of the specific bid strategy, the bidder agent 36 is generated by the central processing unit 30 of the remote bidder site 20 (Step 110), exits the bidder site and is transmitted over the Internet (Step 112).

If the bidder does not confirm agreement with the specific bidding strategy generated, he can choose to abandon creation of the bidder site 20 or can amend the information in the bid template (Step 108B). If the bidder chooses to abandon creation of the bidder site, the process ends (Step 108C) and if he chooses to amend the bid criteria, Steps 106 and 108A are repeated, the bidding strategy generator 34 calculating a modified specific bidding strategy.

The creation of a seller site 40 will now be described with reference to FIG. 5. A person ("seller") at a remote site 40 on the network 10 ("seller site") wishes to sell a car by auction. The seller activates the on-line auction facility on his computer terminal 42 by clicking on the appropriate icon on his screen 44 (Step 200). The seller is first requested to input whether he wishes to bid or to sell and selects the sell icon displayed on the screen 44 (Sep 202). A sell template appears on the screen 44 into which the seller must enter information via the keyboard 46 concerning the car he wishes to sell, such as the manufacturer, the model type, the year of manufacture, the minimum price that he is prepared to accept for the car and details of when the auction is to take place (Step 204). It should be understood that other information concerning the car to be sold can also be input as desired and that the information entered by the seller will vary in accordance with the merchandise to be sold.

The input data is transmitted to the processing unit 50 of the seller site terminal 42 and the optimum type of auction for sale of such merchandise is determined (e.g. Sealed bid, Vickery, English or Dutch) by the selling strategy generator 54, together with optimum values for the reserve bid price Rp and for the starting bid price Sp, if an English or Dutch type auction has been determined as the optimum auction type (Step 206). The optimum reserve Rp (and starting Sp) bid prices calculated and the auction type to be conducted are displayed on the screen 44 and the seller is requested to confirm agreement with these strategy parameters and that the specific selling strategy generated should be implemented (Step 208A). On confirmation of agreement with the reserve (and starting) bid prices and to the implementation of the generated selling strategy, the seller agent 56 is generated by the processing unit 50 of the seller site 40 (Step 210). The seller agent 56 waits at the seller site 40 until the designated auction time begins (Step 212). If the seller does not confirm agreement with the specific selling strategy generated, he can choose to abandon creation of the seller site 40 or can amend the information in the selling template (Step 208B). If the seller chooses to abandon creation of a seller site, the process ends (Step 208C), and if he chooses to amend the sell criteria, Steps 206 and 208 are repeated, the selling strategy generator 54 calculating a modified specific selling strategy.

It should be understood that the seller may wish to designate the type of auction which he wishes to be conducted on completing the selling template on the screen 44. In this instance, only the optimum reserve (and optimum) bid prices for such an auction type will be calculated by the selling strategy generator 54.

Figure 6A:
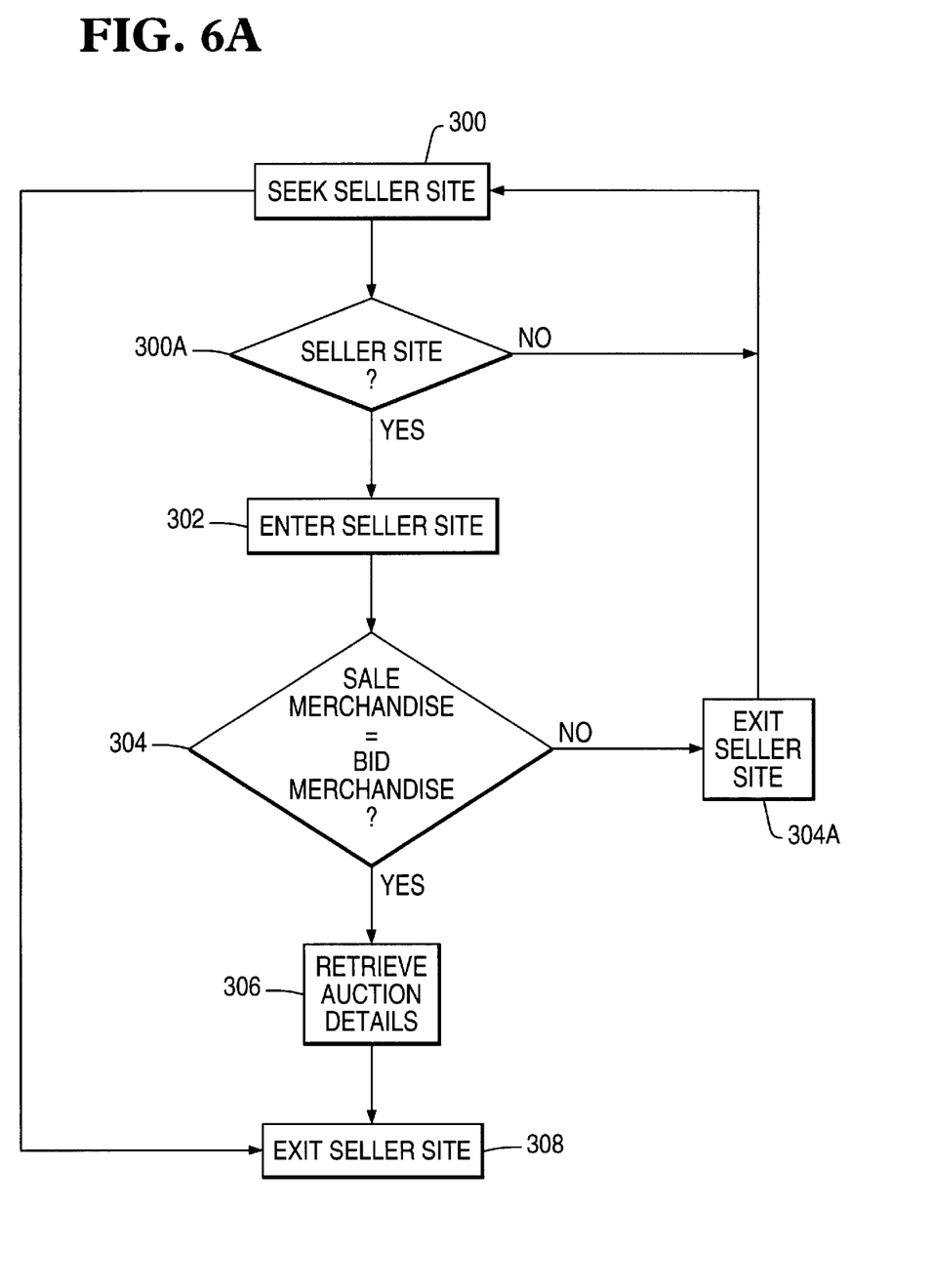
FIGS. 6A, 6B and 6C are flow diagrams representing a search by a bidder agent for a seller site and the conducting of an auction at that seller site.

Referring now to FIG. 6A, the bidder agent 36 searches for seller sites 40 on the network within the geographical area limitations stipulated by the bidder (Step 300) and on locating a first seller site 40 (Step 300A) enters therein (302) where it communicates with the resident seller agent 56 so as to determine details of the merchandise offered for auction at that site (Step 304). If the merchandise for auction does not include a car matching the criteria specified by the bidder, the bidder agent 36 leaves that seller site 40 without retrieving any further information (Step 304A) and steps 300 to 304 are repeated. If the merchandise for auction includes a car matching the criteria specified by the bidder, the bidder agent 36 communicates with the seller agent 56 further, so as to retrieve further information relating to the auction (Step 306). This information includes an estimate of the approximate price that the cur is expected to sell for at the auction, the time at which the auction is to take place and the type of auction to be conducted (e.g. Sealed bid, Vickrey, English or Dutch). These details are stored in the bidder agent 36.

The bidder agent 36 then exits the seller site 40 (Step 308) and moves on over the network 10 until a further seller site 40 is found, where Steps 302 and 304 are repeated. This process continues until all seller sites 40 within the specified geographical area limitation of the network 10 have been found. It should be understood that the bidder agent 36 could be arranged to terminate the search for seller sites 40 after a predetermined time period has lapsed or after a predetermined number of appropriate seller sites 40 have been found. If no seller sites 40 are found or no seller sites 40 offering merchandise for auction matching the criteria specified by the bidder, the bidder agent 36 returns to the bidder site 20 and informs the bidder that no seller sites have been found.

Figure 6B:
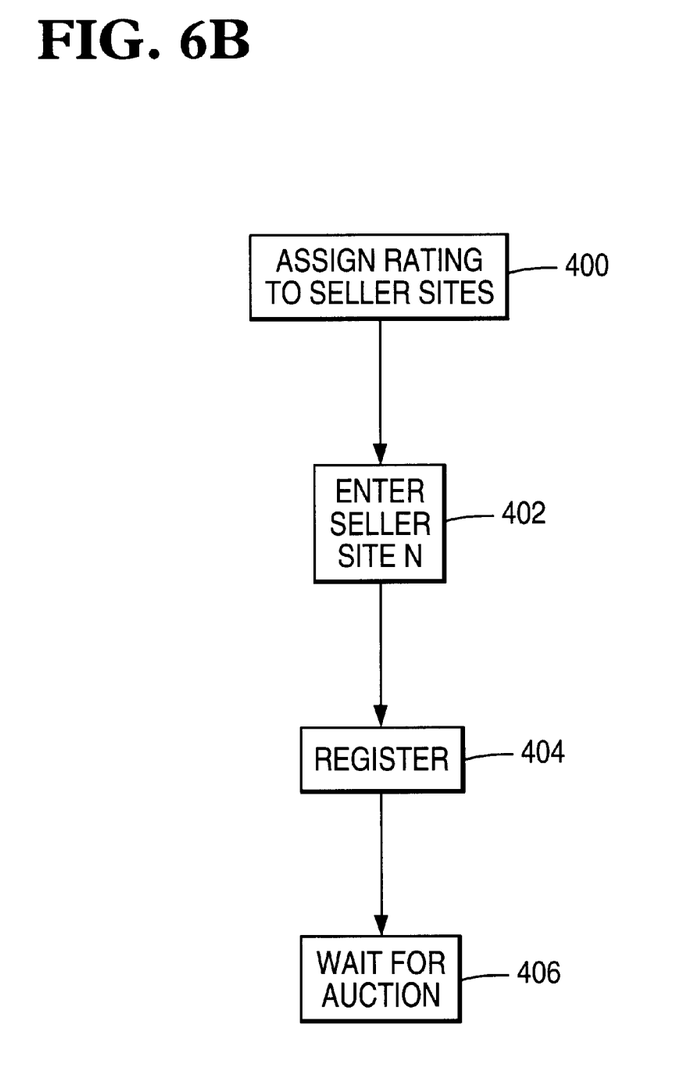

Referring to FIG. 6B, on leaving the last seller site 40, the bidder agent 36 compares the information retrieved from each seller site 40 and assigns a rating to each site on the basis of the retrieved information. (Step 400). These ratings represent a priority system in which the seller sites 40 will be revisited and can be calculated on the basis of the time of the auction, the seller site at which the next auction is due to commence being given the highest rating, the approximate price estimated by the bidder, the seller site or sites with an approximate price within the range specified by the bidder being assigned the highest ratings, the geographical location of the seller site, the site located closest to the bidder site being assigned the highest rating or a combination of all or any of the former three.

The bidder agent 36 then moves back to the seller site 40 which has been assigned the highest rating (Step 402) and registers therein (Step 404). Registration involves the communication of predetermined data to an auction manager 60 located at the seller site 40, the data comprising bidder identification details, such as the bidders name, address, bidder site details and bidder account details such as credit card or bank account details by which payment will be effected in the event that the bidder is successful at the auction. The bidder agent 36 then waits at the seller site 40 until the auction begins (Step 406) or in the case of a sealed bid or Vickrey auction until such time as bids are accepted. It should be appreciated that at this time, several bidder agents 36 from a plurality of different remote bidder sites 20 may have entered the seller site 40, have registered and be waiting for the auction to begin. These bidder agents 36 will be similar to that described above but may have different specific bidding strategies encoded and embedded therein in dependence on the data entered by their bidder and on the structure and sophistication level of the bidding strategy generator 34 at their bidder site 20. The bidder agents 36 will have reached the seller site 40 in a similar manner as described above.

Figure 6C:
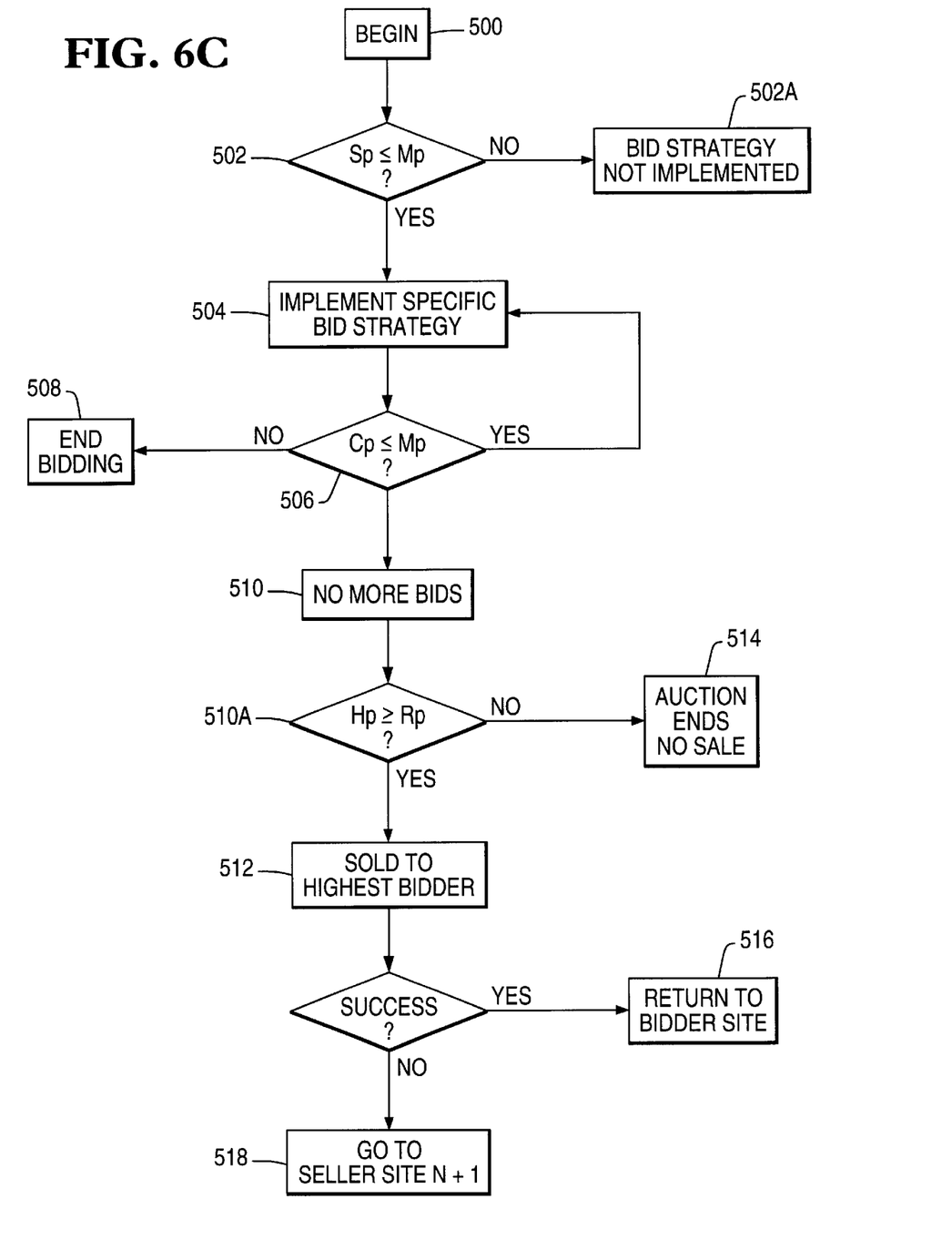

Referring to FIG. 6C, the auction begins (Step 500). If the type of auction being conducted at the selling site is an English auction, the selling agent 56 will begin implementation of its specific selling strategy by opening bidding at the starting price Sp which has previously been generated by the seller strategy generator 54 at that site 40. Each of the individual bidder agents 36 will then implement their own specific bidding strategy by submitting bids higher than the starting price Sp but below the maximum bid price Mp which has been generated by their bidding strategy generator 34 (Steps 502 and 504). The auction manager 60 monitors the auction proceedings and controls the order in which bids from the bidder agents 36 are accepted by the seller agent 56. It should be understood that if the starting bid price Sp is higher than the maximum bid price Mp of any of the bidding agents 36 at the auction, no bids will be received and the auction will end without any sale and that some bidding agents 36 may fail to participate in the bidding because that the starting bid price Sp is higher than the maximum bid price Mp of that bidding agent 36 (Step 502A).

As the bid price progressively increases (Step 506), some of the bidder agents 36 may cease implementation of their specific bidding strategy because the current bid price Cp exceeds the maximum bid price Mp generated for that bidding agent 36 (Step 508). The auction continues until no more bids are received (step 510) and the car is sold to the highest bidding agent provided that the highest bid price Hp equals or exceeds the reserve bid price Rp generated by the selling strategy generator 56 at that site 40 (Steps 510A and 512). If no further bids are received and the highest bid price Hp is less than the reserve bid price Rp, the auction is declared closed by the auction manager 60 without any sale (Step 514). The auction at seller site 40 is now complete and the successful bidding agent 36 returns home to its bidder site 30 and informs the bidder of his purchase (Step 516). Te selling agent 36 also informs the seller of the results of the auction. It should be understood that payment will be subsequently effected by the seller agent 56 on the basis of the information given by the bidder agent 36 on registration, prior to delivery of the car to the successful bidder.

At the end of the auction, the unsuccessful bidding agents 36 move on to the selling site 40 which has been assigned the next highest rating (Step 518) and Steps 402 to 516 are repeated thereat.

It should be understood that the bidder agent 36 could be also arranged to travel to selling sites 40 specified by the bidder rather than seeking out selling sites itself. This situation could arise when the bidder was aware of suitable selling sites 40, perhaps through reputation or if the bidder had participated in an auction at that selling site 40 on a previous occasion. It is likely that such selling sites 40 will be dedicated auction sites which regularly conduct auctions, such as, for example, an air travel company which auctions unsold flight tickets at the last minute.

The bidder agent 36 may also conduct its search by communicating with other bidder agents 36 at a seller site 40 to exchange information about seller sites 40 that have been visited. In this way, the bidder agent can "learn" of new seller sites.

It should be understood that a seller site may crate a plurality of seller agents at his remote seller site, each conducting an auction to sell particular merchandise. These auctions may run simultaneously. A bidder may also create a plurality of bidder agents which exit the bidder site and act on the bidders behalf at a plurality of seller sites. However, the auction manager at a seller site will not allow two bidder agents originating from the same bidder site to bid at the same auction.

What is claimed is:

1. An interactive computer system for conducting auctions over an open communications network comprising:
   (a) a number of remote seller sites; and
   (b) a number of remote bidder sites interconnected with the number of remote seller sites;
   (c) one of the remote bidder sites comprising:
      (i) data input means for entering input data relating to desired merchandise that a bidder desires to acquire at an auction;
      (ii) bidding strategy generation means for automatically generating a bidding strategy on the basis of the input data relating to the desired merchandise; and
      (iii) mobile bidder agent means adapted to:
      (1) locate one or more remote seller sites on the network;
      (2) move away from the remote bidder site and execute at one or more located remote seller sites to determine if merchandise details of merchandise for auction at each of the one or more located remote seller sites match criteria from the input data for the desired merchandise that the bidder desires to acquire;
      (3) retrieve auction details regarding details of an auction far the merchandise from the one or more located remote seller sites if the criteria matches the merchandise details; and
      (4) implement the generated bidding strategy during the auction at one or more of the located remote seller sites where the criteria matches the merchandise details; and
   (d) one of the remote seller sites comprising:
      (i) data input means for entering data relating to merchandise to be auctioned;
      (ii) selling strategy generation means for generating a selling strategy on the basis on the input data relating to the merchandise to be auctioned;
      (iii) seller agent means adapted to implement the generated selling strategy by interaction with one or more bidder agents at the remote seller site; and
      (iv) auction management means for controlling and synchronizing he bidder and seller agent means during an auction at the remote seller site.

2. A system according to claim 1, wherein the selling strategy generation means comprises means for deter an optimum value for a reserve price of the merchandise to be auctioned.

3. A system according to claim 1, wherein the selling strategy generation means comprises means for determining an optimum type of auction for a sale of the merchandise to be auctioned.

4. A system according to claim 1, wherein the bidding strategy generation means comprises means for determining an optimum value for a maximum bid price for the desired merchandise.

5. A system according to him 1, wherein the bidder agent means comprises means for storing the merchandise details and the auction details retrieved from the located remote seller sites.

6. A system according to claim 1, wherein the bidder agent means comprises means for comparing the merchandise details and the auction details retrieved from a plurality of the located remote seller sites and means for selecting one of the located remote seller sites at which to implement the generated bidding strategy on a basis of a comparison.

7. A system according to claim 1, wherein the bidder agent means is arranged to communicate with other bidder agent means at one of the remote seller sites to exchange information to learn about other remote seller sites.

8. An interactive computer system for conducting auctions over an open communications network comprising:
   (a) a number of remote seller sites; and
   (b) a number of remote bidder sites interconnected with the number of remote seller sites;
   (c) one or the remote bidder sites comprising:
      (i) a data input device for entering input data relating to desired merchandise that a bidder desires to acquire at an auction;
      (ii) a bidding strategy generator for automatically generating a bidding strategy on the basis of the input data relating to the desired merchandise; and
      (iii) a mobile bidder agent for:
      (1) locating one or more remote seller sites on the network;
      (2) moving away from the remote bidder site and executing at one or more located remote seller sites to determine if merchandise derails of merchandise for auction at each of the one or more located remote seller sites match criteria from the input data for the desired merchandise that the bidder desires to acquire;
      (3) retrieving auction details regarding details of an auction for the merchandise from the one or more located remote seller sites if the criteria marches the merchandise details; and
      (4) implementing the generated bidding strategy dung the auction at one or more of the located remote seller sites where the criteria matches the merchandise details; and
   (d) one of the remote seller sites comprising:
      (i) a data input device for ent data relating to merchandise to be auctioned;
      (ii) a selling strategy generator for generating a selling strategy on the basis on the input data relating to the merchandise to be auctioned;
      (iii) a seller agent for implementing the generated selling strategy by interaction with one or more bidder agents at the remote seller site; and
      (iv) an auction manager for controlling and synchronizing the bidder and seller agents during an auction at the remote seller site.

9. A system according to claim 8, wherein the selling strategy generator comprises means for determining an optimum value for a reserve price of the merchandise to be auctioned.

10. A system according to claim 8, wherein the selling strategy generator comprises means for determining an optimum type of auction for a sale of the merchandise to be auctioned.

11. A system according to claim 8, wherein the bidding strategy generator comprises means for determining an optimum value for a magnum bid price for the desired merchandise.

12. A system according to claim 8, wherein the bidder agent comprises means for storing the merchandise details and the auction details retrieved from the located remote seller sites.

13. A system according to claim 12, wherein the bidder agent comprises means for comparing the merchandise details and the auction details retrieved from a plurality of the located remote seller sites and means for selecting one of the located remote seller sites at which to implement the generated bidding strategy on a basis of a comparison.

14. A system according to claim 8, wherein the bidder agent is arranged to communicate with other bidder agents at one of the remote seller sites to exchange information to learn about other remote seller sites.

15. A method for conducting an auction over an open communications network comprising a plurality of remote interconnected sites, the method comprising the steps of:
  (a) creating one or more seller agents for implementing a predetermined selling strategy in relation to merchandise to be auctioned at one or more remote seller sites;
  (b) creating a plurality of mobile bidder agents at a plurality of remote bidder sites, each of said plurality of bidder agents configured to:
    (i) locate one or more remote seller sites on a network;
    (ii) move away from the remote bidder site and execute at the one or more located remote seller sites to determine if merchandise details of merchandise for auction at each of the one or more located remote seller sites match criteria from input data relating to desired merchandise that a bidder desires to acquire;
    (iii) retrieve auction details regarding derails of an auction for the merchandise from the one or more located remote seller sites if the criteria matches the merchandise details; and
    (iv) implement a bidding strategy during the auction at one or more of the located remote seller sites where the criteria matches the merchandise details;
  (c) transmitting one or more of the plurality of bidder agents over the network to one or more of the located remote seller sites; and
  (d) conducting an auction at the remote seller site by implementing the selling strategy of the seller agent and the bidding strategies of the plurality of bidder agents.

16. A method according to claim 15, further comprising the step of determining an optimum value for a reserve price of the merchandise to be auctioned.

17. A method according to claim 15, further comprising the step determining an optimum type of auction for the sale of the merchandise to be auctioned.

18. A method according to claim 15, further comprising the step determining an optimum value for a maximum bid price for the merchandise.

19. A method according to claim 15, further comprising the steps of storing the merchandise details and the auction details retrieved from the located remote seller sites.

20. A method according to claim 15, further comprising the steps of comparing the merchandise details and the auction details retrieved from a plurality of the located remote seller sires, and selecting one of the remote seller sites at which to implement the bidding strategy on a basis of the comparison.

21. A method according to cam 15, further comprising the step of communicating with one or more of the plurality of bidder agents at the remote seller site to exchange information to learn about other remote seller sites.

22. A system according to claim 6, when the means for selecting one of the located remote seller sites comprises:
  means for assigning a rating to each of the located remote seller sites on the basis of the comparison, wherein the rating represents a priority system in which the located remote seller sites will be revisited; and
  means for selecting the located remote seller site based on the rating.

23. A system according to claim 1 wherein the bidder agent is adapted to locate one or more remote seller sites on the network until a predetermined time period has lapsed, a predetermined number of remote seller sits have been located, or all remote seller sites within a specified geographic area have been located.

24. A system according to claim 13, wherein the means for selecting one of the located remote seller sites comprises:
  means for assigning a rating to each of the located remote seller sites on the basis of the comparison, wherein the raring represents a priority system in which the located remote seller sites will be revisited; and
  means for selecting the located remote seller site based on the rating.

25. A system according to claim 8 wherein the bidder agent locates one or more remote seller sites on the network until a predetermined time period has lapsed, a predetermined number of remote seller sites have been located, or all remote seller sites within a specified geographic area have been located.

26. A method according to claim 20, wherein selecting on of the located remote seller sites comprises:
  assigning a rating to each of the located remove seller sites on the basis of the comparison, when the rating represents a priority system in which the located remote seller sites will be revisited; and
  selecting the located remote seller site based on the rating.

27. A method according to claim 15 wherein the bidder agent is configured to locate one or more remote seller sites on the network until a predetermined time period has lapsed, a predetermined number of remote seller sites have been located, or all remote seller sites within a specified geographic area have been located.

* * * * *

UNITED STATES PATENT AND TRADEMARK OFFICE
CERTIFICATE OF CORRECTION

PATENT NO. : 6,871,190 B1
DATED : March 22, 2005
INVENTOR(S) : Seymour et al.

It is certified that error appears in the above-identified patent and that said Letters Patent is hereby corrected as shown below:

Column 9,
Line 47, delete "far" and insert -- for --.
Line 66, after "for", delete "deter" and insert -- determining --.

Column 10,
Line 40, after "merchandise" (first occurrence), delete "derails" and insert -- details --.
Line 48, after "strategy", delete "dung" and insert -- during --.
Line 53, after "for", delete "ent" and insert -- entering --.

Column 11,
Line 7, delete "magnum" and insert -- maximum --.
Line 39, after "regarding", delete "derails" and insert -- details --.

Column 12,
Line 13, delete "cam" and insert -- claim --.
Line 28, after "seller", delete "sits" and insert -- sites --.
Line 35, delete "raring" and insert -- rating --.
Line 45, after "selecting", delete "on" and insert -- one --.

Signed and Sealed this

Third Day of January, 2006

JON W. DUDAS
*Director of the United States Patent and Trademark Office*